J. WILKIE.
FRUIT PROCESSING MACHINE.
APPLICATION FILED JULY 20, 1908.

910,336.  Patented Jan. 19, 1909.

WITNESSES:

INVENTOR
John Wilkie
BY Geo. H. Strong.
ATTORNEY

UNITED STATES PATENT OFFICE.

JOHN WILKIE, OF YUBA CITY, CALIFORNIA.

FRUIT-PROCESSING MACHINE.

No. 910,336.

Specification of Letters Patent.

Patented Jan. 19, 1909.

Application filed July 20, 1908. Serial No. 444,387.

*To all whom it may concern:*

Be it known that I, JOHN WILKIE, citizen of the United States, residing at Yuba City, in the county of Sutter and State of California, have invented new and useful Improvements in Fruit-Processing Machines, of which the following is a specification.

My invention relates to an apparatus which is designed for preparing fruit, such as prunes and the like, which preparation is technically known as "processing".

It consists in the combination with a revoluble and partially submerged cylinder, of means for continuously delivering the fruit to be processed into the interior of the cylinder where it is submerged in the processing liquid, and means by which the fruit is directed into chutes carried by the cylinder, said chutes serving to raise the fruit and discharge it continuously from the opposite side of the cylinder.

My invention comprises combinations of parts, and details of construction, which will be more fully explained by reference to the accompanying drawings, in which—

Figure 1:
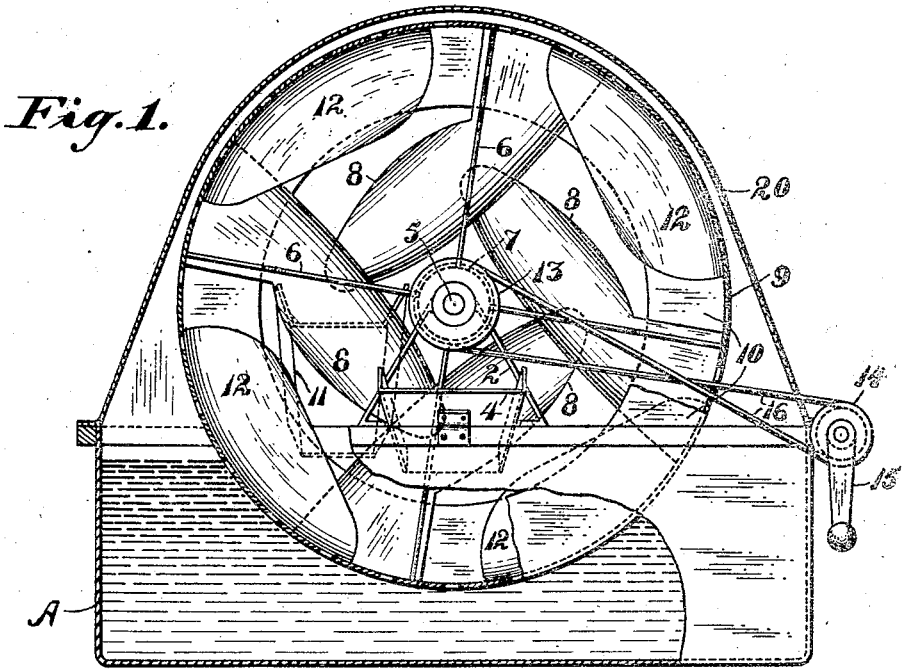
Figure 2:
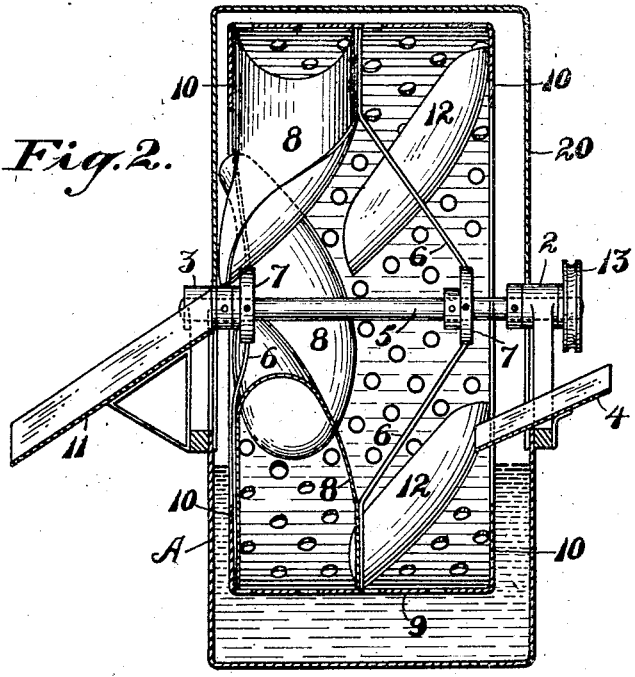

Figure 1 is a vertical section transverse to the axis. Fig. 2 is a longitudinal sectional view.

For the purpose of preparing fruit for drying and for other purposes, especially such fruit as prune plums, it is desirable to soften and cut the skins of the prune plums by the application of a strong alkaline liquid, such as lye, into which the fruit is submerged, and from which it is afterwards lifted, washed and prepared for drying. In order to carry out a process of this kind economically and continuously, I have shown a trough or receptacle A of any desired size and of material adapted to contain the lye. Upon the sides of this trough are fixed journal-box supports 2 and 3. The support 2 is preferably made of arched or equivalent form, extending some distance above the edge of the box and allowing sufficient space between its legs for the installing of a chute 4. This chute may be bolted or otherwise attached to the edge of the box, and has a sufficient inclination and convergence so that fruit placed in the chute will pass down the incline and be delivered inwardly with relation to the box.

5 is a shaft having mounted upon it a spider frame 6 which is here shown as connected with a hub or collar 7, and the arms 6 extend diagonally and outwardly from the collar. The outer ends of these arms serve to partially support troughs 8 which are fixed within the periphery of a perforated drum 9. The ends of the drum are in the form of annular rims 10 fitting the edges of the peripheral and perforated portions, and extending inwardly a short distance, as shown. The inlet trough or chute 4 extends over the inner edge of one of these annular rims, and its discharge end projects into the drum. This construction with the inclined diverging arms 6 allows the end of the chute to thus enter the drum and the latter to be revolved without any contact or interference of the drum or its attachments with the chute.

The troughs 8 are made to extend from the inner surface of the perforated periphery of the drum to near the center of the side opposite that on which the feed is located. These troughs are shown as having their inner edges tangent to the hub or collar 7 upon that side of the drum. These troughs converge or taper, and the inner edges are curved over in such a manner, that as the drum is revolved, anything delivered into the outer ends of these troughs or chutes will, as the drum revolves, be carried upwardly until the angle of the chute becomes such that the contents will slide outwardly and be delivered from the convergent tips of the chutes at a point just above the horizontal line of the shaft and a little to one side thereof. At this point a discharge chute 11 is fixed to the side of the trough, inclining outwardly and having its upper end so located that anything discharged from the chutes 8 will be delivered into this discharge chute and carried off thereby to any desired receptacle.

In order to properly agitate the material which is supplied to the drum, the latter is rotated so that its lower portion is continually submerged in the liquid contained in the tank A, and the fruit delivered into the drum will thus be subjected to the action of the liquid.

On the side of the drum contiguous to the supply chute are a series of diagonally placed wings 12. These wings are fixed around the interior periphery of the drum, the outer ends lying substantially against the rim 10 on the feed side. The opposite ends of the wings are carried diagonally across the drum periphery until they terminate at points so related to the chutes 8 that the fruit which has been delivered into the receiving side of the drum will be caught by these wings during the drum's revolution, and moved transversely across the drum to such points that when the inner ends of the wings have passed, they will have forced this fruit to such a point that it will be taken up by the interior revolving chutes 8 and lifted and disposed of as previously described. The arrangement of the wings and the chutes with relation to each other is such that the wings slightly overlap the contiguous sides of the chutes, which are so cut away as to allow the fruit to be discharged into the chutes.

Any suitable or desired means for revolving the drum may be employed, such as belt pulleys 13 and 14 and a belt extending between them, pulley 13 being mounted upon the drum shaft, and 14 upon a countershaft journaled upon the end of the tank and provided with a crank 15 by which it may be revolved, and power transmitted through the belt 16 to revolve the drum.

The apparatus as thus constructed is an efficient labor-saving means for applying the desired treatment to the fruit.

As the dip liquid must be kept at or near the boiling point for most effective work, it will be understood that the tank A should, in practice, be provided with some suitable heating means not shown.

A removable cover or housing 20 is so fitted as to inclose the working parts, and thus retain the heat.

Having thus described my invention, what I claim and desire to secure by Letters Patent is—

1. An apparatus for processing fruit, said apparatus including a liquid-containing tank, a horizontally-journaled drum, means for revolving the drum with its lower periphery submerged in the liquid, means for discharging the fruit into the interior of the drum, diagonally disposed wings carried in the drum periphery, chutes extending from the interior of the drum to points contiguous to the center and at one side of the drum, the receiving sides of the chutes overlapping the inner ends of the wings, means for delivering fruit into the interior of the drum, and means for receiving and discharging the fruit from the opposite side thereof.

2. In an apparatus of the character described, a liquid-containing tank, a horizontally-journaled drum having its lower side submerged in the tank, said drum having annular rims and a perforated periphery, chutes extending from the interior of the drum periphery to points contiguous to the center and at one side of the drum, diagonally disposed wings fixed in the interior of the drum having their inner ends overlapping the receiving sides of the chutes, means for directing the fruit to be treated into the drum to be acted upon by the wings, and means for carrying away the fruit which is discharged through the opposite side of the drum from the chutes.

3. In an apparatus of the character described, a horizontally-journaled revoluble drum, a tank in which its lower portion is submerged, means for supplying fruit to the interior of the drum, and guides located within the drum whereby the fruit is advanced in successive stages from the inlet to the discharge end, said guides comprising members extending from the interior of the drum periphery to points contiguous to the center and at one side of the drum, and other members fixed to the drum having their inner ends overlapping the receiving portions of the first-named members.

4. In an apparatus of the character described, a horizontally-journaled revoluble drum, a tank in which its lower portion is submerged, means for supplying fruit at one end of the drum, and wings and chutes, located within the drum, and so disposed with relation to each other that the inner ends of one overlaps the receiving portion of the other to advance the fruit from the receiving end, deliver it into the chutes and finally discharge it from the opposite end.

5. In an apparatus of the character described, a horizontally revoluble drum, a tank in which its lower portion is submerged, journal-boxes for the drum shaft, one of said boxes having divergent supports, an inclined feed chute extending between said supports into the end of the drum, diagonally disposed wings fixed within the receiving end of the drum, convergent chutes extending from near the center and periphery of the drum to the discharge end, and diagonally divergent spider arms extending from the shaft and supporting the chutes.

In testimony whereof I have hereunto set my hand in presence of two subscribing witnesses.

JOHN WILKIE.

Witnesses:
S. J. STABLER,
A. C. MCLAUGHLIN.